United States Patent [19]

Larrabee

[11] 4,131,827
[45] Dec. 26, 1978

[54] POWER TRANSFER APPARATUS
[75] Inventor: Robert D. Larrabee, Princeton, N.J.
[73] Assignee: RCA Corporation, New York, N.Y.
[21] Appl. No.: 821,801
[22] Filed: Aug. 4, 1977
[51] Int. Cl.² .......................................... H02P 7/80
[52] U.S. Cl. ................................. 318/46; 318/107;
  307/64; 307/80
[58] Field of Search ................... 318/46, 107, 108, 98;
  290/4 R; 307/44, 48, 64, 66, 80

[56] References Cited
U.S. PATENT DOCUMENTS

| 1,174,373 | 3/1916 | Wright | 318/46 |
| 3,050,635 | 8/1962 | Tanner | 307/64 |
| 3,696,286 | 10/1972 | Ule | 307/66 X |
| 3,946,242 | 3/1976 | Wilkerson | 290/4 R |

*Primary Examiner*—Gene Z. Rubinson
*Attorney, Agent, or Firm*—H. Christoffersen; Samuel Cohen; William Squire

[57] ABSTRACT

A power transfer apparatus transfers electrical energy from a DC voltage source that may vary in potential, e.g., a solar cell array, to a load such as a DC motor connected to drive an AC motor-generator. A power transfer device couples the solar cells to the DC motor for driving the DC motor at a power level consistent with the power available from the array of solar cells. The AC motor is continuously connected to an AC line to be driven by conventional AC power. The DC motor, when operating, reduces the load on the AC motor and thereby reduces the AC power drawn or in some cases, causes the generator driven by the DC motor to return power to the AC line.

10 Claims, 2 Drawing Figures

POWER TRANSFER APPARATUS

Of interest is the following copending application Ser. No. 821,786, (RCA 69,998) entitled, POWER TRANSFER APPARATUS, filed on or about even date herewith by the present inventor and assigned to the same assignee as the present invention.

The present invention relates to power transfer apparatus for optimizing power utilization from a source whose output voltage may vary.

Solar cells are not inherently well matched to many common loads. The load impedance that they require for maximum power output is a function of incident sunlight. Many loads have a daily demand schedule that is incompatible with the daily sunlight cycle and/or changing weather conditions. The above noted copending application provides a system for interfacing solar cells to loads of different types. One problem addressed in that application is the interfacing of a panel of solar cells with a battery. Also disclosed is the interfacing of a panel of solar cells with a DC motor.

Conventional utility sources of AC power are readily available for driving loads. In these days of increasing cost of utility supplied power and the need for conservation of resources, it is desirable to reduce the consumption of such power. One possible approach is to employ the direct current generated by solar cells to supplement the utility supplied power and in cases where there is more direct current produced than can be utilized by the load, to convert it to alternating current and supply it to the AC power lines. However, there is a problem in interfacing solar cells acting as a power source with an AC power source in that the two are not compatibile in such characteristics as frequency, phasing, the means required for control of voltage and current and so on. The solution can be complex and expensive.

A system embodying the present invention comprises a source of DC power which may vary, connections for a source of AC power, a DC motor having an armature and a field winding and power transfer means coupling the source to the motor for supplying current to the armature of the motor and for also supplying a voltage across the field winding of the motor, the power transfer means including means for adjusting the value of the voltage. An AC motor-generator is connected to the connections for the source of AC power for receiving operating power therefrom. The motor-generator is mechanically coupled to the DC motor and being driven thereby, means responsive to a parameter indicative of the power supplied to the DC motor controls the means for adjusting in a sense to maximize the parameter.

Figure 1:
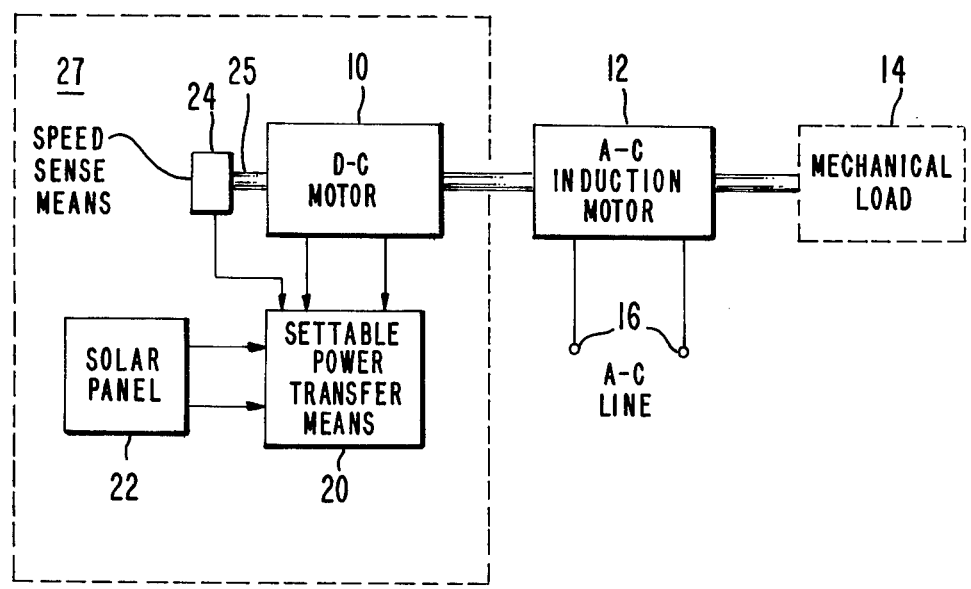
FIG. 1 is a block diagram of a system embodying the present invention.

In FIG. 1 a conventional DC motor 10 has its drive shaft coupled to the drive shaft of an AC induction motor 12 whose drive shaft is optionally connected to a suitable mechanical load 14. The AC motor is a motor-generator device which is coupled to a conventional AC line at terminals 16. Power on the AC line drives the motor 12. Settable power transfer means 20 drives the DC motor 10 with power generated by solar panel 22. Motor speed sense means 24 senses the speed of DC motor 10 shaft 25 and provides a speed signal to the power transfer means 20. The power transfer means 20 in response to a signal produced by the speed sense means 24 controls the field current to the DC motor 10 field winding in a manner to provide a maximum speed for the DC motor for a given available power provided by the solar panel 22. For any given voltage level provided by the panel 22, the power transfer means 20 determines the DC motor 10 optimum speed and then shifts the value of the field current to the DC motor to achieve that optimum speed.

The purpose of the power transfer means 20 is to maximize the power supplied to the motor 10 over a range of values of output power of the panel 22. In the copending application the means 20 adjusts the voltage applied to the field winding in a sense to obtain maximum motor speed at the level of power output then available from the solar panel 22. The means 20 may have the structure of the comparable means of the copending application. An alternate embodiment is described in connection with FIG. 2 which is specifically adapted for the system of FIG. 1.

In FIG. 1 the DC motor and AC induction motor 12 are coupled together as a rotary converter to perform a DC to AC interfacing function. The induction motor has an advantageous characteristic in operating as a power interfacing element. If the speed of the motor is less than synchronous it will draw power from the AC line. If the speed is greater than synchronous it will supply power to the line. A load on the motor decreases its speed causing it to draw more power. Regardless of the speed of the motor, the frequency of the power at the input terminals is always line frequency. On the other hand, the DC motor does not load up the AC motor with no power applied to the DC motor. The DC motor acts as a free running device in this latter case. The induction motor primarily derives power from the AC power system to drive a load. The DC motor derives available power from the solar panel and contributes its share toward driving the load. The power transfer means 20 between solar panel 22 and the DC motor 10 operates the DC motor at the maximum rotational speed possible for the available solar panel power assuring that the maximum available solar power is converted to rotary motion. This action is consistant with the non-synchronous character of the AC induction motor because this motor will interpret the DC motor's mechanical output as a reduction in its load. If the solar panel outputs just happens to be zero, the induction motor will run slightly below synchronous speed and supply all the power required by the load. If a small amount of power then becomes available from the solar panel, the power conditioning circuit of FIG. 1 will sense this and cause the DC motor to contribute some torque towards driving the load. This will speed up the system and lower the power drain from the AC line thus automatically causing the DC motor and the AC induction motor to share the load. If the solar cells can supply all the power required by the load, the system will rotate at synchronous speed and virtually no power will be drawn from the AC line. If still more solar panel power becomes available, the system of FIG. 1 will speed up rotation above synchronous speed and cause the induction motor 12 to supply excess power to the AC line for use somewhere else. Advantageously, this system automatically uses the AC line as a buffer to both supply power when needed and to utilize excess power when available. Since induction motors are in common use, efficient, relatively inexpensive, and may in any event be required to drive a load, they are especially well suited for the system of FIG. 1.

In the above-noted copending application a system was described for driving a DC motor with a solar panel. In the present system of FIG. 1, the AC line is always connected to the system at turn-on, and therefore, the stalled condition due to the absence of sunlight noted in the aforementioned copending application is not a condition that is present in the system of FIG. 1. Further, since the system of FIG. 1 will be operating near synchronous speed at all times, the total range of operation of the DC motor field current required for effective control is not as great as occurs in the system of the copending application. Thus, the power transfer means 20 in FIG. 1 need only handle a small fraction of the DC motor field power for control purposes (possibly 10 percent of the total DC motor field power). Further, since the field power may be only 10 percent of the DC armature power, the net power that needs to be optimized by the transfer means 20 may be only 1 percent of the total power delivered by the solar panel 22.

Figure 2:
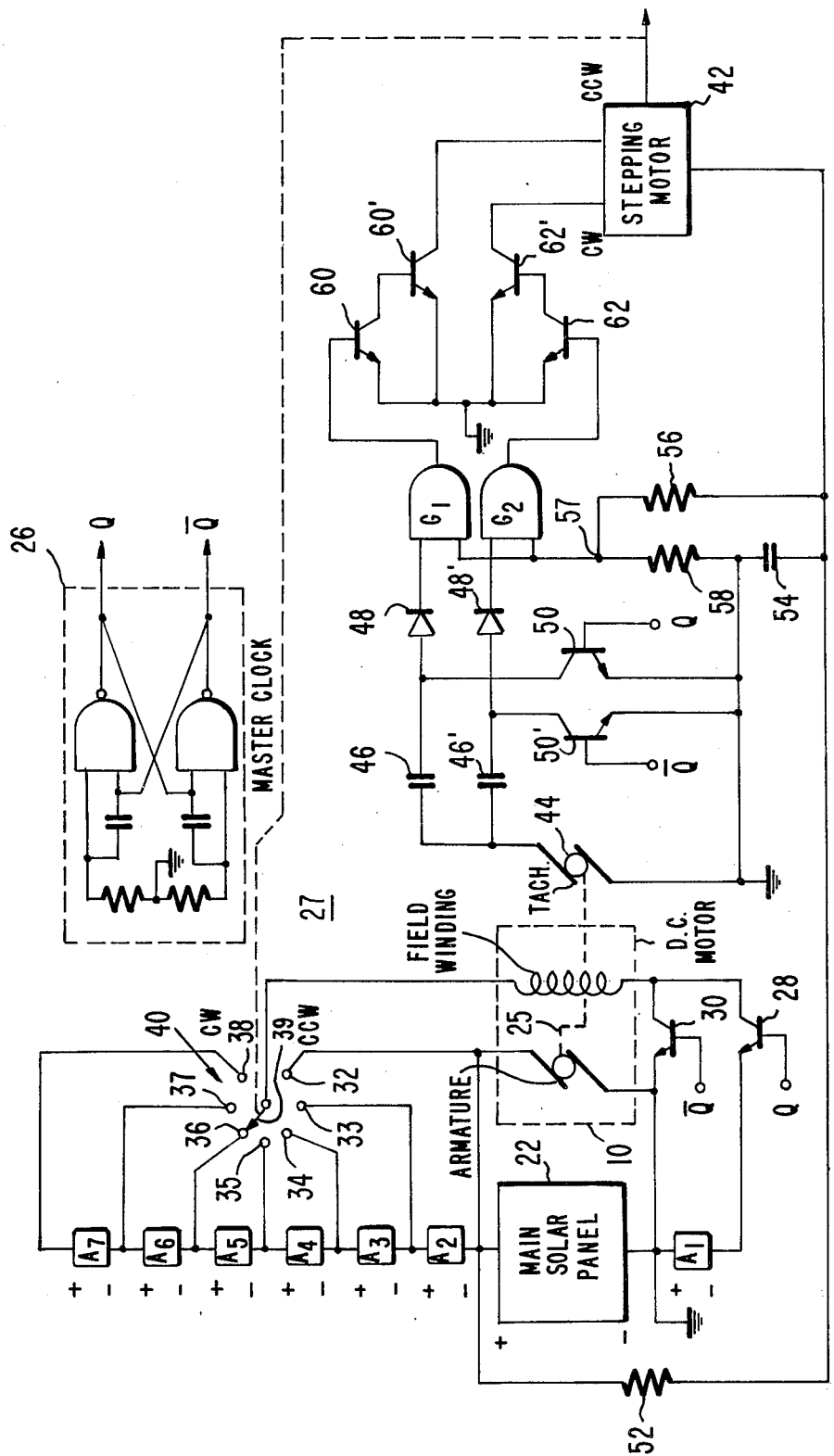
FIG. 2 is a circuit diagram showing one form of the system of FIG. 1.

The elements 10, 20, 22 and 25 of FIG. 1 forming system 27 are shown in FIG. 2. The DC motor 10 armature is connected directly across the solar panel 22 and the output of the settable portion of the power transfer means 20 includes a plurality of low power solar arrays $A_2$-$A_7$ connected in series with the solar panel 22 to provide the variable voltage levels required for controlling the field current through the DC motor. This permits a relatively high power system to be fully controlled by a relatively low power conditioning circuit.

In FIG. 2, master clock 26 can be any conventional clock source which provides a squarewave output on each of its outputs Q and $\overline{Q}$, $\overline{Q}$ being complementary to Q. The particular circuit shown comprises cross-connected NAND gates which operate as an oscillator. The copending application previously noted illustrates the output waveforms of such a clock.

Auxiliary low power solar cell panel array $A_1$ which may have a capacity of about one percent of the main solar panel array 22, is serially connected with panel 22 through the collector-emitter path of transistor 28 to the field winding of the DC motor 10. The base electrode of transistor 28 is connected to the Q output of clock 26. A second transistor 30 has its collector connected to the connection between collector transistor 28 and the field winding and its emitter connected to the connection between panel 22 and array $A_1$. The base electrode of transistor 30 is connected to the $\overline{Q}$ output of clock 26. The transistors 28 and 30 are of the NPN type and as they receive complementary voltages, thus conduct in complementary fashion. A logic one level (high) causes a transistor to conduct and a logic zero level (low) switches a transistor off. When transistor 28 is conducting and transistor 30 non-conducting the main solar panel 22 voltage plus the voltage of panel $A_1$ is applied to the DC motor field winding. When transistor 30 is conducting and transistor 28 is non-conducting, panel $A_1$ is switched out of the circuit and only the main solar panel 22 voltage is applied to the DC motor field winding.

The positive terminal of panel 22 is connected to switch contact 32 of rotary switch 40 and to the armature of the DC motor. The positive terminal of the solar panel 22 is also connected through low power auxiliary solar panel $A_2$ (which also may have a power of about one percent of main panel 22) to contact 33, through panel arrays $A_2$ and $A_3$ to contact 34, and panel arrays $A_2$, $A_3$, $A_4$, to contact 35. The panel arrays $A_2$-$A_7$ are in a similar manner serially connected in incremental steps to the remaining contacts 36-38 as shown. Wiper 39 of switch 40 is driven by stepping motor 42 as shown by the connecting dashed line. Wiper 39 is connected to the other end of the field winding of the DC motor 10.

The clock 26 alternately turns-on transistors 30 and 28 alternately providing respectively low and high field currents through the field windings. This cyclically increases and decreases the field current of the DC motor. Any changes in the speed of the motor thus produced are sensed by the tachometer 44 which is coupled to the motor armature by shaft 25. Tachometer 44 provides an output DC voltage whose value corresponds to the speed of the DC motor. One terminal of tachometer 44 is connected to ground and the other terminal is connected to one input of AND gate $G_1$ through serially connected capacitance 46 and diode 48. This terminal is also connected through capacitance 46' and diode 48' to one input of a second AND gate $G_2$. The lead joining capacitance 46 with diode 48 is connected to ground through the collector-emitter path of transistor 50 whose base is coupled to the Q output of clock 26. The lead joining capacitance 46' with diode 48' is connected to ground through the collector-emitter path of transistor 50' whose base electrode is connected to the $\overline{Q}$ output of clock 26. Resistance 52 and capacitance 54 are serially connected between the positive terminal of solar panel 22 and ground. The connection between resistance 52 and capacitance 54 is connected to the input winding of stepping motor 42. Voltage dividing resistances 56 and 58 are connected between the lead joining resistance 52 and capacitance 54 and ground. The tap 57 on this voltage divider connects to the other input of gates $G_1$ and $G_2$. Resistances 56 and 58 provide a suitable low voltage to the inputs of gates $G_1$ and $G_2$ and thus inhibit their action when capacitance 54 is not sufficiently charged. The output of gate $G_1$ is connected to the base electrode of transistor 60 which is coupled with transistor 60' as a Darlington pair. The collector-emitter path of transistor 60' is connected between the counter-clockwise (CCW) winding of the stepping motor 42 and ground. Whenever the output of gate $G_1$ goes high, transistor 60 is biased on, in turn biasing on transistor 60' and discharging capacitance 54 through the CCW winding of stepping motor 42 to ground driving the wiper 39 switch 40 in the CCW direction. This reduces the current in the field winding of the DC motor.

The output of gate $G_2$ is connected to the base electrode of transistor 62 which is coupled with transistor 62' as a Darlington pair. The collector-emitter path of transistor 62' is connected between ground and the CW winding of the stepping motor 42. Whenever the output of the gate $G_2$ goes high, transistor 62 becomes conductive and the stepping motor 42 may be energized by the discharge of capacitance 54 to drive the wiper 39 in a clockwise direction. This increases the DC motor field current.

Auxiliary solar panels $A_1$-$A_7$ do not handle armature current and therefore have an output power that is relatively low compared to the main solar panel output power, their output voltage adds to that of the main panel 22 and is just enough for one step in the field current control circuit. Thus, they may be quite small and inexpensive compared to the main solar panel.

In operation, the capacitance 54 is charged by the solar panel 22 through resistance 52. Capacitance 54 and resistance 52 have an RC time constant of a few seconds which is much greater in duration than the time period of the output of the clock 26. Due to the alternate cycling of transistors 30 and 28, the field winding of motor 10 receives alternately larger and smaller currents causing the motor 10 to vary in speed in successive clock cycles. The tachometer 44 output produces an increasing DC voltage as the motor speeds up and a DC decreasing voltage as the motor speed decreases. When there is a full charge on capacitance 54, it supplies a logic one (high) level to one input of each of the gates $G_1$ and $G_2$. When Q is high, transistors 28 and 50 conduct and when $\overline{Q}$ is high transistors 50' and 30 conduct.

Assuming an undercoupled conidtion that is, the armature of the DC motor is drawing less than optimum current from the main solar panel, the corrective measure required is less field current (magnetic field within the motor) so that the internally generated armature counter-voltage will be less for any given speed and the armature current will be greater. The percentage increase in armature current will then exceed the percentage reduction of field current (magnetic field), the output torque will increase, thus speeding up the motor to a new equilibrium condition at a higher speed at a higher armature current. Thus, in the undercoupled condition, the portion of each clock period that Q is high (hereafter termed the Q cycle) the motor speed will tend to decrease and during the portion of each clock period that $\overline{Q}$ is high (hereafter termed the $\overline{Q}$ cycle) the motor speed will tend to increase. During the Q cycle, capacitance 46 is connected across the tachometer 44 by transistor 50 and transistor 50' is off. The tachometer charges this capacitance. During the following $\overline{Q}$ cycle, transistor 50 turns off disconnecting the charged capacitance 46 from ground. The voltage present across this capacitance is now in series and in opposition with the tachometer output voltage. The charge placed on capacitance 46 during the Q cycle corresponds to the minimum speed attained at the end of the Q cycle. During the $\overline{Q}$ cycle, when transistor 50 is off, the motor speed is increasing so that the voltage applied to the input of gate $G_1$ via diode 48 will be an increasing function of time. If the speed increase is sufficiently large, this voltage increases to a level high enough to activate gate $G_1$ and the latter turns on the Darlington pair 60, 60'. Capacitance 54 thereupon discharges through the enabled gate $G_1$ and the CCW winding of the stepping motor causing the latter to drive the wiper 39 in the counter-clockwise direction to decrease the number of auxiliary panels $A_2$-$A_7$ in the field circuit, to thereby decrease the current supplied to the field winding of motor 10. The input to gate $G_2$ through diode 48' is zero or negative under these undercoupled conditions, because the charge left on capacitance 46' is that corresponding to the maximum speed attained during the $\overline{Q}$ cycle. In the subsequent Q cycle the motor speed decreases. This decreasing speed results in a negative voltage at the input to gate $G_2$ as the tachometer output voltage decreases with respect to the fixed voltage left on capacitor 46' at the end of the previous $\overline{Q}$ cycle when the speed was a maximum. Diode 48' limits the current flow into gate $G_2$ during these negative input conditions. Thus, gate $G_2$ is not activated under these conditions. The wiper 39 steps toward the desired setting at a speed determined by the resistor 52, capacitance 54 time constant until the speed variation near the maximum become small enough such that the gate $G_1$ is no longer activated during the Q cycle. At this point, all action stops until there is a change in the cell illumination or a change in the loading of the motor.

An overcoupled motor is defined as one which is drawing more than optimum current from the main solar panel, the output voltage of the solar panel is undesirably low, because of internal IR drops, and the power delivered to the armature circuit is below optimum. This is the exact opposite of the undercoupled case discussed above and it requires an increase in field current for its correction. This is accomplished by the transistor 50', capacitance 46', diode 48', gate $G_2$, and the Darlington pair, transistors 62, 62' in an analogus way to that discussed above for the undercoupled case. During a $\overline{Q}$ cycle, transistor 50' conducts and the tachometer 44 charges capacitance 46' through this conducting transistor. During the following Q cycle $\overline{Q}$ goes low turning off transistor 50' and the residual voltage across capacitance 46' is placed in series with the tachometer output voltage In the overcoupled condition, the motor speed increases when Q is high and decreases when $\overline{Q}$ is high in converse to the situation in the undercoupled condition. Accordingly, at the end of the $\overline{Q}$ cycle the charge on capacitance 46' corresponds to the minimum motor speed and during the following Q cycle when transistor 50' is off, the motor speed increases as does the voltage produced by the tachometer 44 so that the voltage applied through diode 48' to gate $G_2$ increases with time. When the speed increase is sufficiently large, the voltage supplied to gate $G_2$ through diode 48' becomes sufficiently high to activate gate $G_2$ and thus turn on the Darlington pair 62, 62'. The capacitance 54 thereupon discharges through the CW winding of the stepping motor causing the latter to rotate wiper 39 in the clockwise direction and to increase the number of auxiliary panels $A_2$-$A_7$ in the circuit and thereby to increase the field current supplied to motor 10. This reduces the armature current. The input to AND gate $G_1$ is zero or negative under these overcoupled conditions for similar reasons as is the input to gate $G_2$ explained in connection with the undercoupled condition. Thus gate $G_1$ is not activated during this period.

Summarizing the operation of the present system, a DC motor is operated by a variable power DC source such as a solar array. Under varying conditions of illumination, the power supplied by the array to the motor varies. A sensor senses a parameter of the motor (such as speed) indicative of the power actually being supplied to the motor and feeds back a signal to the means coupling the panel to the motor in a sense to maximize the parameter. In the embodiments discussed, the feedback signal is employed to adjust the voltage across the field winding of the motor. The DC motor and an AC operated device together drive a load. The greater the DC power actually used by the motor, the less AC power required to drive the load and in the limit the AC operated device can actually supply AC power back to the AC source.

What is claimed is:

1. The combination of:

a source of DC power which may vary;

connections for a source of AC power;

a DC motor having an armature and a field winding;

power transfer means coupling said source to said motor for supplying current to the armature of said motor and for also supplying a voltage across the field winding of said motor, said power transfer means including means for adjusting the value of voltage;

an AC motor-generator connected to said connections for said source of AC power for receiving operating power therefrom, said motor-generator being mechanically coupled to said DC motor and being driven thereby; and means responsive to a parameter indicative of the power supplied to said DC motor for controlling said means for adjusting in a sense to maximize said parameter.

2. The apparatus of claim 1 wherein said parameter is the armature speed of said DC motor, said power transfer means includes means for cyclically increasing and decreasing said DC motor armature speed, a plurality of DC power sources, and switch means responsive to said DC motor armature speed for placing selected ones of said DC power sources in series with said field winding for setting the field winding current value.

3. The apparatus of claim 2 wherein said switch means includes speed sense means for generating a speed signal corresponding to the armature speed of said DC motor, a power select switch coupled to said plurality of power sources, logic means responsive to said speed signal applied as an input thereto for generating a control signal indicating that cycle in which the armature speed of said DC motor is greater in value, and switch drive means responsive to said control signal for selecting certain of said plurality of power sources corresponding to the maximum attainable armature speed of the DC motor.

4. The apparatus of claim 2 where in said means for cyclically increasing and decreasing said speed includes; a clock means for generating a cyclic signal having first and second values, an auxiliarly power source, and switch means responsive to the value of said cyclic signal to alternately connect and disconnect said auxiliary power source to said field winding.

5. The apparatus of claim 1 wherein said power transfer means includes settable impedance matching means responsive to said parameter for matching the impedance of said variable power source and the impedance of said DC motor for all values of said DC power.

6. The apparatus of claim 5 wherein said impedance matching means inclues a plurality of DC power sources serially connected, a first terminal connected to one end of said serially connected sources, a plurality of switch terminals, each switch terminal being respectively connected to a separate junction between said sources and to the other end of said serially connected sources, said switch contact means being connected to said field winding at one end, said first terminal being coupled to the other end of said field winding, said means responsive to a parameter selectively connecting said contacts means to one of said switch terminals in accordance with the value of said parameter.

7. A power transfer system comprising:
electrical energy generating means for generating electrical power from incident solar light,
a DC motor,
an AC induction motor having its drive shaft coupled to the DC motor drive shaft, means for coupling an AC power source to said induction motor for driving said AC motor in the absence of sufficient solar light, means for sensing the speed of said DC motor, and settable power transfer means coupled between said DC motor and said generating means responsive to said means for sensing speed for driving said DC motor at a maximum speed corresponding to any level of power then being generated by said generating means.

8. The apparatus of claim 7 wherein said electrical generating means includes a main solar cell panel and auxiliary solar cell array, the armature of said DC motor being connected to said main solar panel, the DC motor field winding being selectively connected to certain ones of the cells of said auxiliary array, and switch means coupled to said auxiliary array for selectively connecting said certain ones of cells to said field winding, said certain ones of cells corresponding to said maximum speed.

9. In combination:
an AC induction motor including input means for receiving AC power,
a DC motor coupled to said AC motor,
a main DC power source that may shift in voltage value,
the armature of said DC motor being connected to said DC power source for producing armature current;
a first auxiliary DC power source,
means for alternately connecting said main power source and then said main and auxiliary power sources in series across the field winding of said DC motor to cyclically provide different armature speeds,
a second auxiliary DC power source connected in series with said first auxiliary and main power sources,
switch means for selectively connecting different portions of said second power source having different voltage levels in series with said first and main power sources across said field winding,
DC motor speed sense means for producing a signal representing said different speeds of said DC motor, and
circuit means responsive to said signal including switch selection means for selecting a given portion of said second power source corresponding to a maximum armature speed of said DC motor for a given voltage level then at said main power source.

10. The combination of claim 9 wherein said circuit means includes motor means for connecting said switch means to said different portions,
logic means coupled to said motor means and to said speed sense means and including first and second current paths for driving said motor means in opposite directions,
said logic means further including direction determining means responsive to said speed sense signal for operating said motor means in a direction tending to equalize said different speeds.

* * * * *